(12) United States Patent
Ziser

(10) Patent No.: US 12,697,567 B2
(45) Date of Patent: Aug. 4, 2026

(54) WATER TREATMENT SYSTEM AND METHOD

(71) Applicant: Drops Tech 2015 Ltd, Misgav Mobile Post (IL)

(72) Inventor: Baruch Ziser, Misgav Mobile Post (IL)

(73) Assignee: Drops Tech 2015 Ltd, Misgav Mobile Post (IL)

( * ) Notice: Subject to any disclaimer, the term of this patent is extended or adjusted under 35 U.S.C. 154(b) by 435 days.

(21) Appl. No.: 18/514,367

(22) Filed: Nov. 20, 2023

(65) Prior Publication Data

US 2024/0207759 A1 Jun. 27, 2024

(30) Foreign Application Priority Data

Dec. 21, 2022 (IL) .......................................... 299363
Jun. 26, 2023 (IL) .......................................... 304075

(51) Int. Cl.
*B01D 29/54* (2006.01)
*B01D 15/18* (2006.01)
(Continued)

(52) U.S. Cl.
CPC ............. *B01D 29/54* (2013.01); *B01D 15/18* (2013.01); *B01D 15/22* (2013.01); *B01D 15/361* (2013.01);
(Continued)

(58) Field of Classification Search
CPC ...... B01D 15/18; B01D 15/22; B01D 15/361; B01D 27/08; B01D 27/103; B01D 27/142; B01D 27/146; B01D 29/54; B01D 29/58; B01D 35/12; B01D 35/1435; B01D 35/147; B01D 36/001;

B01D 61/18; B01D 2201/302; B01D 2313/083; B01D 2313/44; C02F 1/001; C02F 1/281; C02F 1/283; C02F 1/42; C02F 1/444; C02F 2201/006; C02F 2301/043; C02F 2307/10
See application file for complete search history.

(56) References Cited

U.S. PATENT DOCUMENTS

2015/0321926 A1* 11/2015 McGibbon .............. C02F 1/283
210/287
2016/0353920 A1* 12/2016 Mazzoni .............. B01D 15/362

FOREIGN PATENT DOCUMENTS

EP 0844012 A2 * 5/1998

* cited by examiner

*Primary Examiner* — John Kim
(74) *Attorney, Agent, or Firm* — Stein IP, LLC

(57) ABSTRACT

A water treatment system comprising filter and filter head is provided. The filter comprises: a cartridge; a cap attached to the cartridge; the cartridge comprises: first compartment comprising first water-treating medium/s; second compartment comprising second water-treating medium/s; the cap comprises a selector. The filter further comprises bypass/es extending from the selector and throughout first compartment and into second compartment, each of the bypass/es having an inlet and an outlet. In first state all water entering the filter passes through the first compartment; in second state all water entering the filter bypasses first compartment and passes through second compartment. In intermediate state/s first part of water enters the filter passing through the first compartment and a second part of water enters the filter bypassing the first compartment and passes through the second compartment. The filter head is reversibly attachable to the cap.

20 Claims, 7 Drawing Sheets

(51) Int. Cl.

| | |
|---|---|
| *B01D 15/22* | (2006.01) |
| *B01D 15/36* | (2006.01) |
| *B01D 27/08* | (2006.01) |
| *B01D 27/10* | (2006.01) |
| *B01D 27/14* | (2006.01) |
| *B01D 29/58* | (2006.01) |
| *B01D 35/12* | (2006.01) |
| *B01D 35/143* | (2006.01) |
| *B01D 35/147* | (2006.01) |
| *B01D 36/00* | (2006.01) |
| *B01D 61/18* | (2006.01) |
| *C02F 1/00* | (2023.01) |
| *C02F 1/28* | (2023.01) |
| *C02F 1/42* | (2023.01) |
| *C02F 1/44* | (2023.01) |

(52) U.S. Cl.

CPC ........... *B01D 27/08* (2013.01); *B01D 27/103* (2013.01); *B01D 27/142* (2013.01); *B01D 27/146* (2013.01); *B01D 29/58* (2013.01); *B01D 35/12* (2013.01); *B01D 35/1435* (2013.01); *B01D 35/147* (2013.01); *B01D 36/001* (2013.01); *B01D 61/18* (2013.01); *C02F 1/001* (2013.01); *C02F 1/281* (2013.01); *C02F 1/283* (2013.01); *C02F 1/42* (2013.01); *C02F 1/444* (2013.01); *B01D 2201/302* (2013.01); *B01D 2313/083* (2013.01); *B01D 2313/44* (2013.01); *C02F 2201/006* (2013.01); *C02F 2301/043* (2013.01); *C02F 2307/10* (2013.01)

WATER TREATMENT SYSTEM AND METHOD

BACKGROUND

Commercially available water purification systems for household use suffer from several shortcomings. For example, various vendors offer a comprehensive line of jugs that include a replaceable small component with ion-exchange resin as well as activated carbon media, which do help purify the water passing through the media; however, the water is typically tasteless and too low in minerals such as magnesium as a result of the ion-exchange on the resin, and the activated carbon is a perfect substrate for the growth of bacteria and other potentially harmful microorganisms in the filters. In fact, the treated water is typically unsuitable for direct consumption.

A simple bypass could be added to a water purification system which is added to the water exiting the filter, to increase the mineral content. Alternatively, minerals can be added to the water exiting the filter.

However, such proposed solutions either inadequately treat some of the water, or still do not properly address the contamination, or do not provide a good solution to the necessary or desired adjustment of the water's mineral content according to the source of the water [hard or soft], or the user's preference.

Typically, a household's or small/large organization's water purification system includes at least one filter and at least one filter head, each filter has a filter head attached thereon, and water is typically provided to the filter via the filter head. The filter is typically periodically replaced whereas the filter head is reused with new filters. It would be beneficial to be able to retrofit commercially available water purification systems to improve their water quality, however the majority of such systems have the vendor's filter head as the major fixture and thus adjustment of the system is problematic.

SUMMARY

The details of one or more embodiments of the disclosure are set forth in the accompanying drawings and the description below. Other features, objects, and advantages will be apparent from the description and drawings, and from the claims.

One aspect is that the mineral content of the water supplied, for example for household consumption, is tunable in a replaceable filter as opposed to adjustment in a filter head. A user can easily set the filter while using essentially any filter head, without need to do any change or replacement of the filter head which is usually harder to replace and is essentially not replaceable.

The filter is suitable for globally standard commercially available size standards and structures and thus replacement of installed filters with the provided filters does not necessitate installation of a new water treatment system.

The water composition [solutes] varies amongst different countries, towns, and sometimes within the same street at different houses. Therefore, the solution, i.e., tuning the water's flavour according to all users' different preferences, is particularly challenging and revolutionary.

The provided water treatment filters, filter heads and water treatment systems and methods reduce solutes [ions, molecules, gases etc.] by between 0% and 100% and anywhere between in one filtration, without requiring any connecting to a sewage system, without any water storage, and with continuous flow possible, including the options of reducing gases and microorganisms in the treated water. According to one aspect a water treatment system is provided, comprising a filter and a filter head;

the filter comprising:

a cartridge;

a cap attached to the cartridge;

the cartridge comprising:

a first compartment comprising at least one first water-treating medium;

a second compartment comprising at least one second water-treating medium;

the cap comprising a selector;

the filter further comprising at least one bypass extending from the selector and throughout the first compartment and into the second compartment, each of the at least one bypass having an inlet and an outlet;

wherein the selector is operable to allow selecting:

in a first state all water entering the filter passing through the first compartment;

in a second state all water entering the filter bypassing the first compartment and passing through the second compartment;

in at least one intermediate state a first part of water entering the filter passing through the first compartment and a second part of water entering the filter bypassing the first compartment and passing through the second compartment, and the filter head reversibly attachable to the cap.

Some system embodiments further comprise a water inlet extending from the filter head to inside the cap, such that water entering the cap for treatment spills onto the disc.

Some system embodiments further comprise a water outlet extending from the cartridge, and into the filter head.

In some embodiments the cap comprises a reference marking, and the selector comprises:

a dial marked thereon with indications, the indications representing:

the first state, the second state, and at least one intermediate state, wherein each state is embossed at a different location on the dial;

and wherein each state occurs when the indication representing the state is aligned with the reference marking.

In some embodiments the selector further comprises an arcuate trough with an open top;

the dial comprising a rotatable disc having a cut-out part and a solid part, the trough and disc structured and positioned relative to each other such that:

in the first state the solid part completely covers the open top;

in the second state the cut-out part completely faces the open top, and in the at least one intermediate state the cut-out part incompletely faces the open top.

In some embodiments at least one bypass inlet is in the trough.

Some embodiments further comprise a third compartment; the third compartment comprising filter material.

In some embodiments the filter material is ultrafiltration material.

Some embodiments further comprise a filter element within the second compartment and covering each bypass outlet of the at least one bypass, thereby preventing ingress of the second water-treating medium into the at least one bypass.

In some embodiments the cap comprises a space sized to accommodate expansion of the first water-treating medium.

In some embodiments the first water-treating medium is a water softening resin.

In some embodiments second water-treating medium is selected from: titania, iron (III) oxides, iron (III) hydroxides, carbon-based media and mixtures thereof.

In some embodiments the carbon-based media are selected from a group consisting of:

activated carbon, carbon nanotubes, carbon molecular sieves, charcoal, catalytic carbon and mixtures thereof.

Some embodiments further comprising a water outlet extending from the cartridge, through the disc and out of the cap.

In some embodiments the at least one bypasses are internal to the cartridge.

In some embodiments the first state all water passing through the first compartment subsequently passes through the second compartment.

In some embodiments one or more of the at least one bypass comprises magnesium and essentially does not comprise calcium.

In some embodiments one or more of the at least one bypass comprises magnesium and essentially does not comprise calcium.

In some embodiments none of the at least one bypass essentially comprise calcium.

According to another aspect, a water treatment system is provided comprising a filter and a filter head;

the system further comprising a pressure-sensitive button capable of popping when pressure of water flowing out of the filter head is above a predetermined value and sinking when pressure of water flowing out of the filter head is below a predetermined value.

Some embodiments further comprise an observation portal enabling view of water flowing out of the filter head.

Some embodiments further comprise a release portal for release of gases from water flowing out of the filter head.

In some embodiments the observation portal, pressure sensitive button and/or release portal are disposed in the filter head.

In some embodiments with the pressure-sensitive button the filter comprises:

a cartridge;

a cap attached to the cartridge;

the cartridge comprising:

a first compartment comprising at least one first water-treating medium;

a second compartment comprising at least one second water-treating medium;

the cap comprising a selector;

the filter further comprising at least one bypass extending from the selector and throughout the first compartment and into the second compartment, each of the at least one bypass having an inlet and an outlet;

wherein the selector is operable to allow selecting: in a first state all water entering the filter passing through the first compartment;

in a second state all water entering the filter bypassing the first compartment and passing through the second compartment;

in at least one intermediate state a first part of water entering the filter passing through the first compartment and a second part of water entering the filter bypassing the first compartment and passing through the second compartment, and the filter head reversibly attachable to the cap.

It should be appreciated that all combinations of the foregoing concepts and additional concepts discussed in greater detail below are contemplated as being part of the inventive subject matter disclosed herein and may be used to achieve the benefits and advantages described herein.

BRIEF DESCRIPTION OF DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

Figure 1:
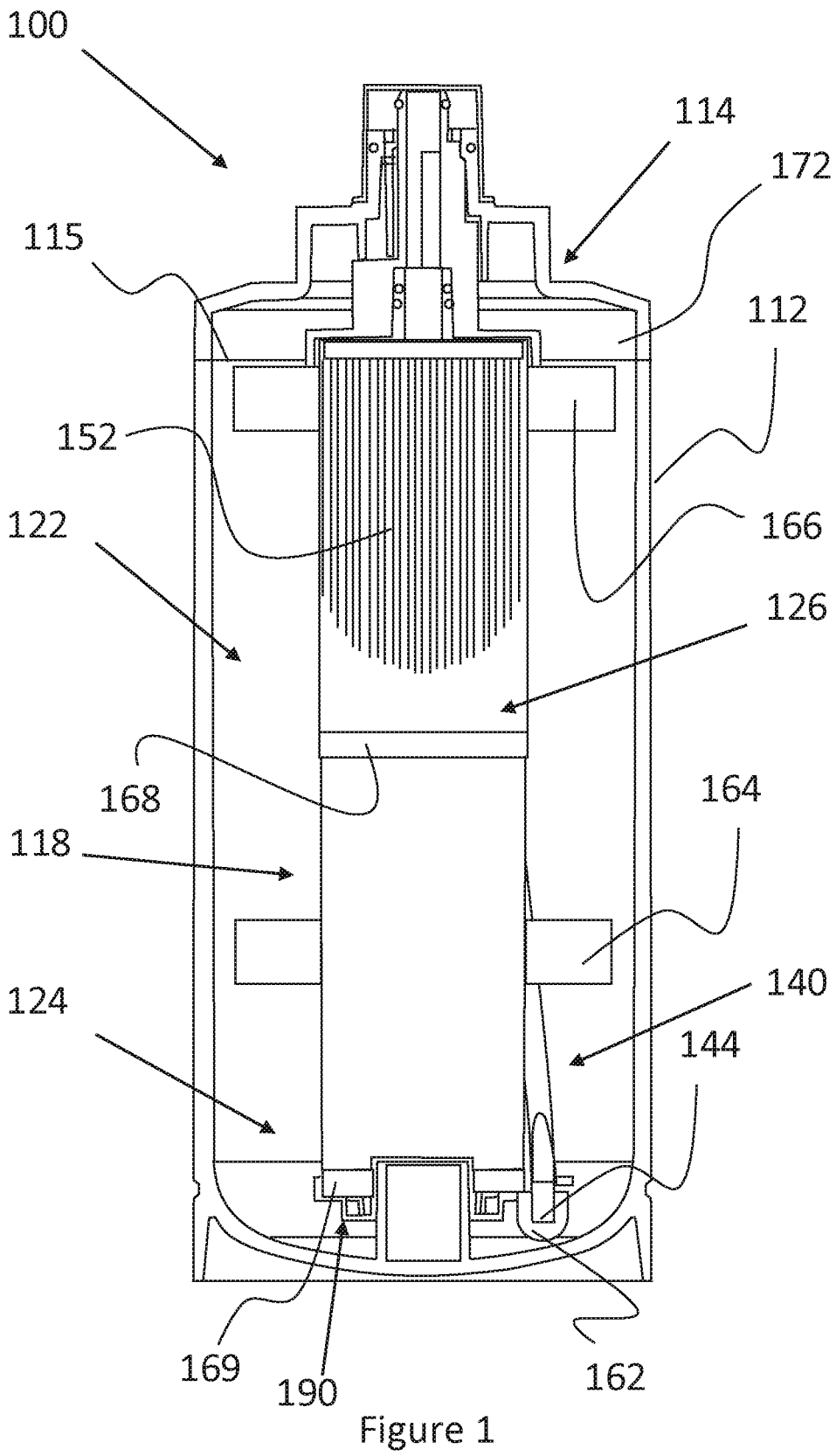
FIG. 1 shows a cross-section of a filter 100.

The accompanying drawings, which are incorporated into and constitute a part of this specification, illustrate one or more embodiments of the disclosure and, together with the detailed description, serve to explain the principles and implementations of the disclosure.

DETAILED DESCRIPTION

The systems, devices, kits, and methods disclosed herein each have several aspects, no single one of which is solely responsible for their desirable attributes. Without limiting the scope of the claims, some prominent features will now be discussed briefly. Numerous other examples are also contemplated, including examples that have fewer, additional, and/or different components, steps, features, objects, benefits, and advantages. The components, aspects, and steps may also be arranged and ordered differently unless explicitly noted otherwise. After considering this discussion, and particularly after reading the section entitled "Detailed Description," one will understand how the features of the devices and methods disclosed herein provide advantages over other known devices and methods.

As used herein and in the appended claims, the singular forms "a," "an," and "the" include plural referents unless the context clearly dictates otherwise. Thus, for example, reference to "XXX includes a plurality of such XXX and reference to "the YYY" includes reference to one or more YYY, and so forth.

Also, the use of "or" means "and/or" unless stated otherwise. Similarly, "comprise," "comprises," "comprising," "include," "includes," "including," "have," "haves," and "having" are interchangeable and not intended to be limiting.

It is to be further understood that where descriptions of various embodiments use the term "comprising," those skilled in the art would understand that in some specific instances, an embodiment can be alternatively described using language "consisting essentially of" or "consisting of."

Unless defined otherwise, all technical and scientific terms used herein have the same meaning as commonly understood to one of ordinary skill in the art to which this disclosure belongs. Although methods and materials similar or equivalent to those described herein can be used in the practice of the disclosed methods and compositions, the exemplary methods, devices and materials are described herein.

Water provided to households often requires filtration. For example, the water might be desalinated, such as when provided by desalination plants to households, or contain an excess of dissolved materials that make the water too hard. The water may also be contaminated with harmful substances and/or microorganisms. The water may also be unpalatable to the users. The various qualities of the supplied water and various needs and tastes of the users pose a great challenge to water-treatment manufacturers in an effort to provide a single system capable of meeting most or all of these various needs and desires.

When relating to water treated in jugs, in those apparatuses there is an overriding concern to extend to the maximum extent the life of the disposable water treating components in the jugs.

Although of course not advertised as such, the jugs are breeding grounds for bacteria and other microorganisms, especially on the active carbon parts of the water treating components. Such proliferation of microorganisms is the reason behind the requirement to boil the treated water before consumption.

Our system aims to provide healthier water that has at least some of the following features:

Adjustability of the acidity of the water close to neutral while the water also has a low to moderate hardness.

Amenability to addition of essential minerals such as magnesium and iodine in accordance with their levels in the water supplied to the client.

Compensation ability for the removal of water-treatment agents present in the feed water [removed to improve the water's flavour and/or odor in the system].

Extended functional life of the water-treating components. Actually the optimization of the life is the least consideration out of the four, and is merely a result of the former three features rather than a designed solution to lifetime problem.

Our system and filter aim to answer this need better than previous treatments offered.

FIG. 1 shows a cross-section of a filter 100.

According to one aspect the filter 100 comprises:

a cartridge 112;

a cap 114 attached to the cartridge 112;

the cartridge 112 comprising:

a first compartment 122 comprising at least one first water-treating medium [not shown];

a second compartment 124 comprising at least one second water-treating medium [not shown].

Figure 2:
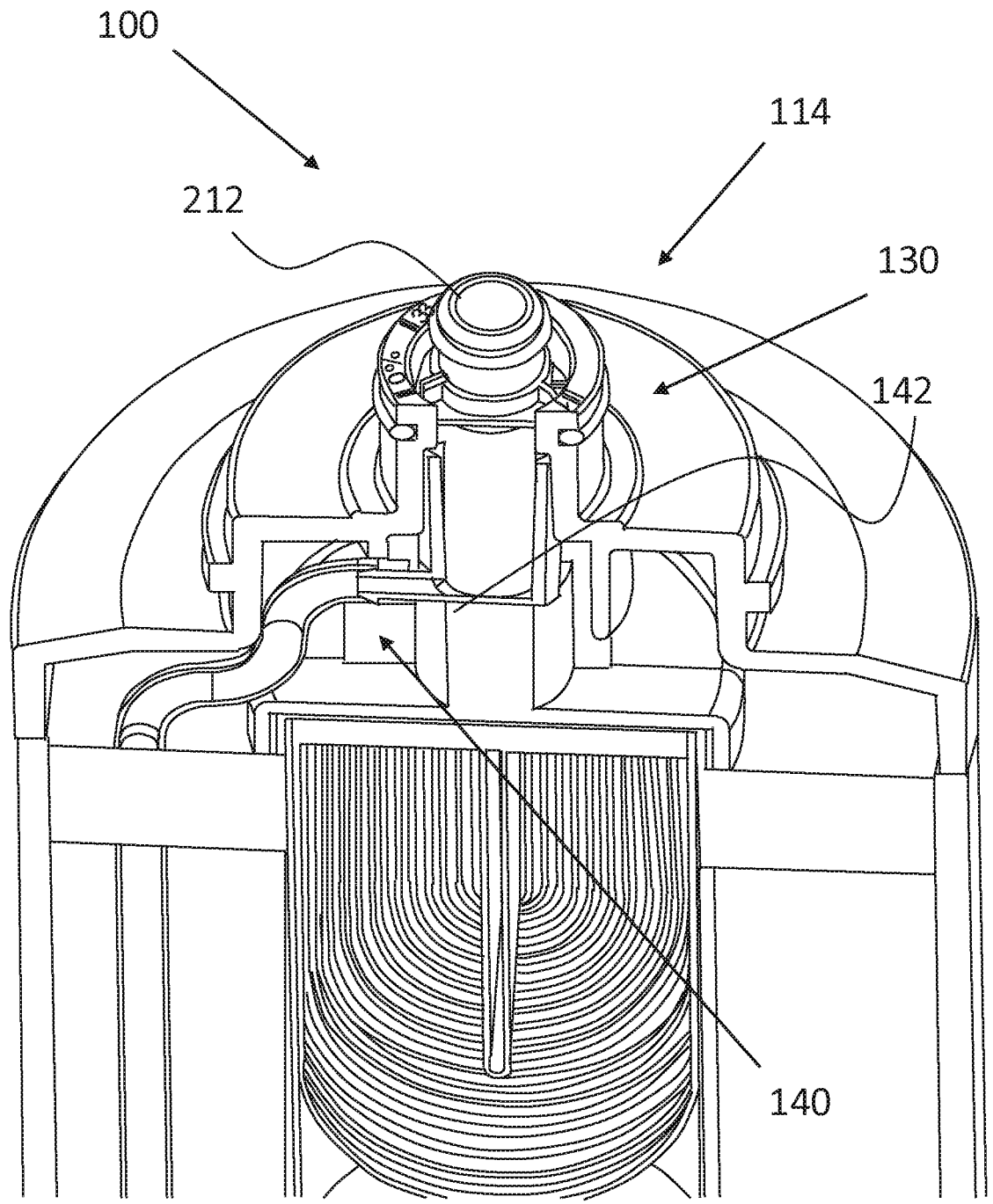
FIG. 2 illustrates in a perspective view part of the filter.

As shown in FIG. 2, the cap 114 comprises a selector 130.

As can been seen by viewing both FIG. 1 and FIG. 2, the filter 100 further comprises a bypass 140 extending from the selector 130 and throughout the first compartment 122 and into the second compartment 124, the bypass 140 having an inlet 142 and an outlet 144.

As will be shown in further figures and in the description below, the selector 130 is operable to allow selecting:

in a first state a first portion of water entering the filter 100 passing through the first compartment 122;

in a second state a second portion of water entering the filter 100 bypassing the first compartment 122 and passing through the second compartment 124, and in at least one intermediate state a third part of water entering the filter 100 passing through the first compartment 124 and a fourth part of water entering the filter 100 bypassing the first compartment 122 and passing through the second compartment 124, wherein the third part is less than the first part and the fourth part is less than the second part.

In some embodiments in the first state all of the water that enters the filter 100 also goes through the first compartment 124, in the second state all of the water that enters the filter 100 goes through the bypass 140.

In some embodiments the bypass comprises compositions that may add solutes to the water passing therethrough. For example, such compositions comprise magnesium. The magnesium may be in a metallic form, for example in an alloy that includes magnesium, or in a non-metallic form, such in magnesium hydroxide or magnesium oxide. In some embodiments the magnesium is provided as a mixture of several different compositions. Such compositions allow for the slow release of magnesium in the water passing through. The compositions may be provided in the form of pellets or beads to provide a large contact area with the water passing through.

At present I believe that the embodiments with at least one bypass comprising magnesium operate most efficiently, but other embodiments described below are also satisfactory.

The addition of magnesium can very advantageous and desirable both taste-wise and health-wise, for example when the water that enters the filter is desalinated water.

In some embodiments the filter comprises a plurality of bypasses. In some embodiments at least one of the bypasses contains the compositions that add the solutes to the filtered water; in some embodiments not all of the bypasses contain these compositions.

In some filter embodiments these compositions are located at another area along the flow path. However, placing the compositions in the bypass is much preferred because for example if the compositions are in the first container, they will be removed by the water softener; moreover the water is passed through a water softener to remove ions such as magnesium so it is counterproductive. If the compositions are in the second container, then the agents, such as activated carbon, can remove [as desired] the reactants such as chlorine that may assist in the desired dissolution of magnesium into the water.

According to the paragraph above, one preferred product of the system is soft water that contain healthful amounts of magnesium. Such water may be suitable for preparation of beverages such as coffee in a coffee machine, that require supply of soft water, but the commercially available systems that provide soft water to such machines do not replenish the magnesium stripped off the water in a water softener. In some embodiments the system comprises bypass/es that do not essentially include calcium but do comprise magnesium. Therefore, in some embodiments the bypass/es may serve to allow very selectively adjusting the mineral content of the water rather softening it.

By "essentially" we mean that water coming out of the bypass has a ppm [mg/L] ratio of Ca/Mg of less than 0.2; more preferably less than 0.1; even more preferably less than 0.05.

In some embodiments the bypass/es can be instead or in addition a source of other minerals such as halides, for example iodine is a beneficial mineral.

For industrial use, such as solely for coffee machines in big firms, system embodiments may comprise bypasses which do not comprise magnesium. For example, these systems may be dedicated to bringing the water hardness to just below the threshold at which scaling occurs, for example 75 ppm. Therefore, the setting of the selector can be chosen to achieve this aim. For water supplies that are fairly consistent, which is the usual case for water supply in a certain region, the water can be tested to determine how to achieve the desired level.

$$100*Y=75 \text{ ppm}/S \text{ ppm}$$

Y is the percentage of water that is set to go through the bypass; S ppm is the hardness of the water in the source supplying the system. Most sources will have at least 75 ppm.

The level of the hardness of the water source can periodically be determined with instrumentation known in the art or in places such as homes with semiquantitative hardness indicating strips.

At homes emphasis may be placed on the health aspects of the system and thus in some home embodiments at least some of the bypasses essentially do not contain calcium but do contain magnesium. These systems require more intensive use of the water softener and thus are costlier to run as the resin requires more frequent replacement.

In referring to a "filter", it may come to mind that the term has a wide range of common, non-uniform meanings. For example, in some cases reference is made to a device or apparatus that contains various components, some of which do physically segregate particles according to their size and/or shape, whereas some other components fulfil other roles, for example housing said segregating component/s. In other uses the segregating component itself is referred to as a filter, and the housing could be referred to as a "cartridge". We have chosen to follow the laymen's nomenclature in this matter, in that an average user of a household water purification system refers to the component that needs to be periodically replaced simply as a "filter".

Examples of commercially available filter heads abound. For example, see https://www.freshwatersystems.com/collections/filter-heads?

https://www.3m.com/3M/en_US/p/c/filtration-separation/liquid-filtration -components/heads/

In systems having such filter heads, as in our system, the filters are fed pressurized water and the water treatment is much superior to water treatment in jugs under gravity alone.

In some embodiments the first water-treating medium comprises an ion-exchange resin.

In some embodiments the second water-treating medium comprises a carbonaceous material such as activated carbon.

Figure 3A:
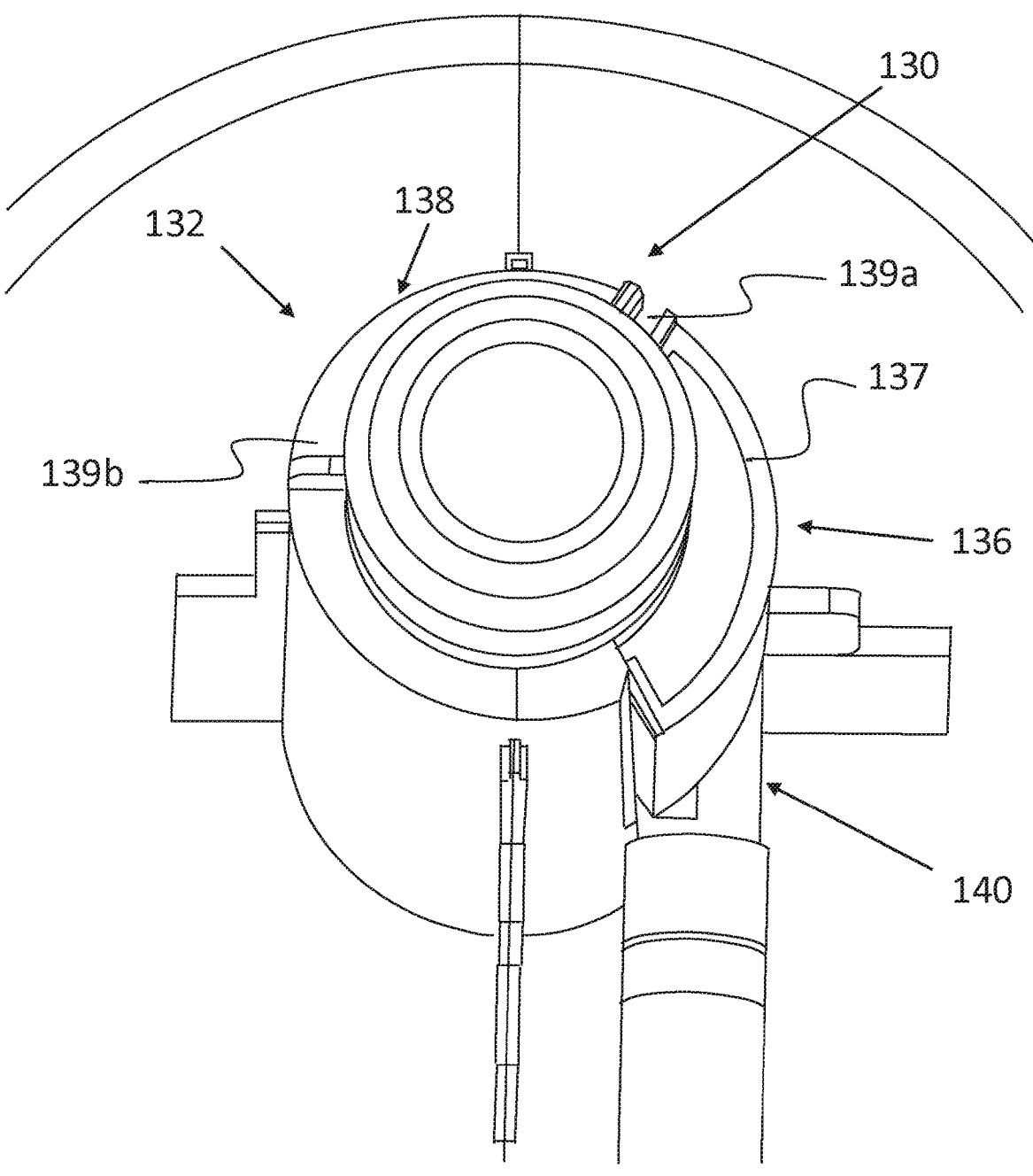
FIG. 3a depicts in a top perspective view a selector for the filter in a first position.

FIG. 3a depicts the selector 130 in the first state, in which the selector 130 is in a state of "100%". In this state the bypass 140 is exposed and water can enter the bypass.

Figure 3B:
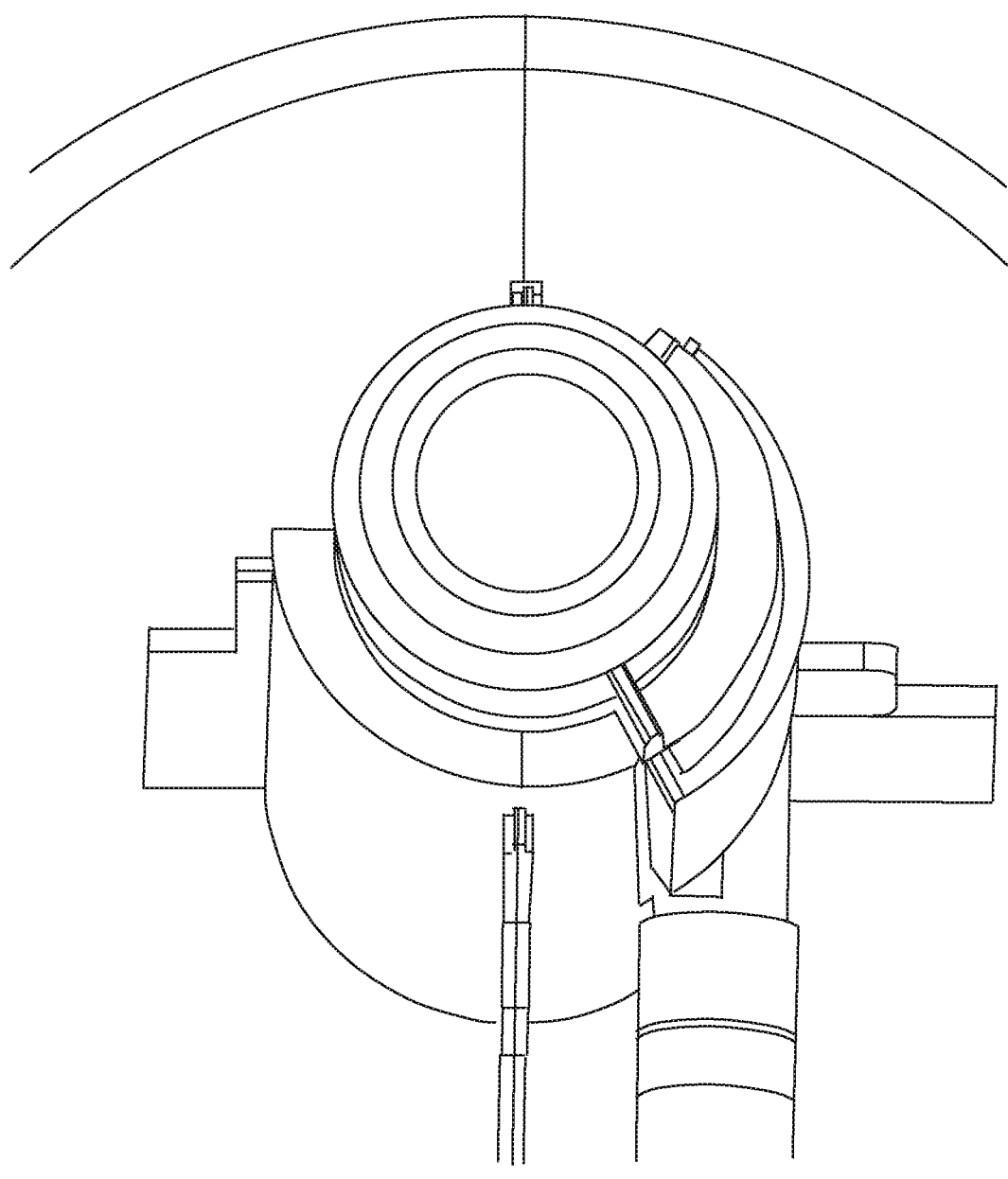
FIG. 3b depicts in a top perspective view the selector in a second position.

FIG. 3b depicts the selector 130 in the second state, in which the selector 130 is in a state of "0%". In this state the bypass 140 is blocked and water cannot enter the bypass. Note that in the figure the blockage is incomplete; this is merely to illustrate the concept and to help visualize the state.

Figure 3C:
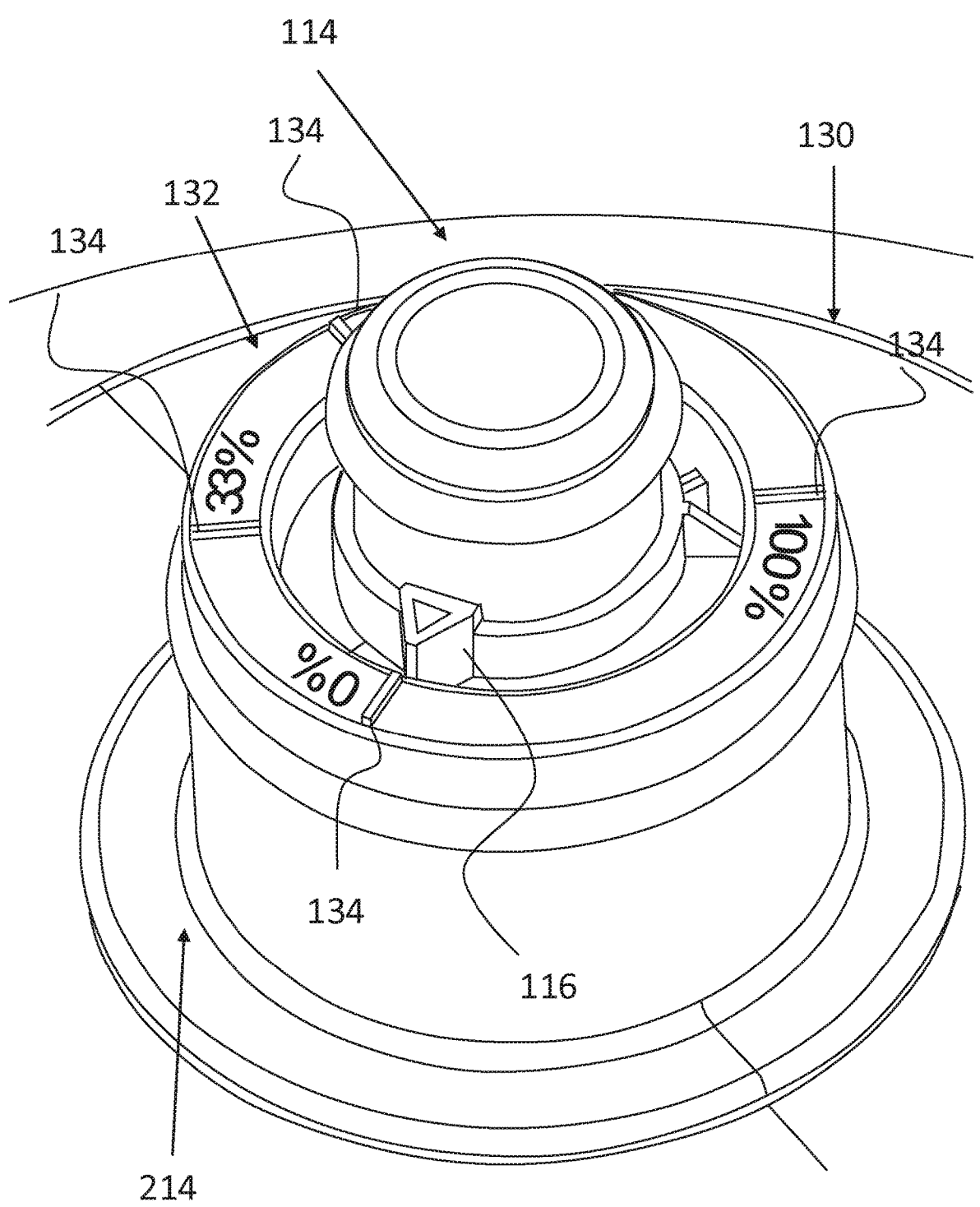
FIG. 3c depicts in a top perspective view the selector in the first position in a slightly different view.

FIG. 3c depicts the selector 130 when the filter is at "0%" state. A user can manually set the desired state according to the dial 132 on the selector 130.

As shown in FIG. 3c, the cap 114 comprises a reference marking 116.

The marking is actually on an exit pipe of the filter [for water after treatment in the filter], but it can be on any other fixture in or on the cap 114.

The selector 130 comprises:
a dial 132 marked thereon with indications 134, the indications 134 representing: the first state, the second state, and at least one intermediate state,
wherein each state is embossed at a different location on the dial 132; and wherein each state occurs when the indication 134 representing the state is aligned with the reference marking 116.

The indications are a combination of the embossments on the dial and another on the body of the cap to know where to set to.

In some embodiments, such shown in FIG. 3a, the selector 130 comprises an arcuate trough 136 with an open top 137.

The dial 132 is shown in this figure without the indications. The dial 132 comprises a rotatable disc 138 having a cut-out part 139a and a solid part 139b.

Figure 4:
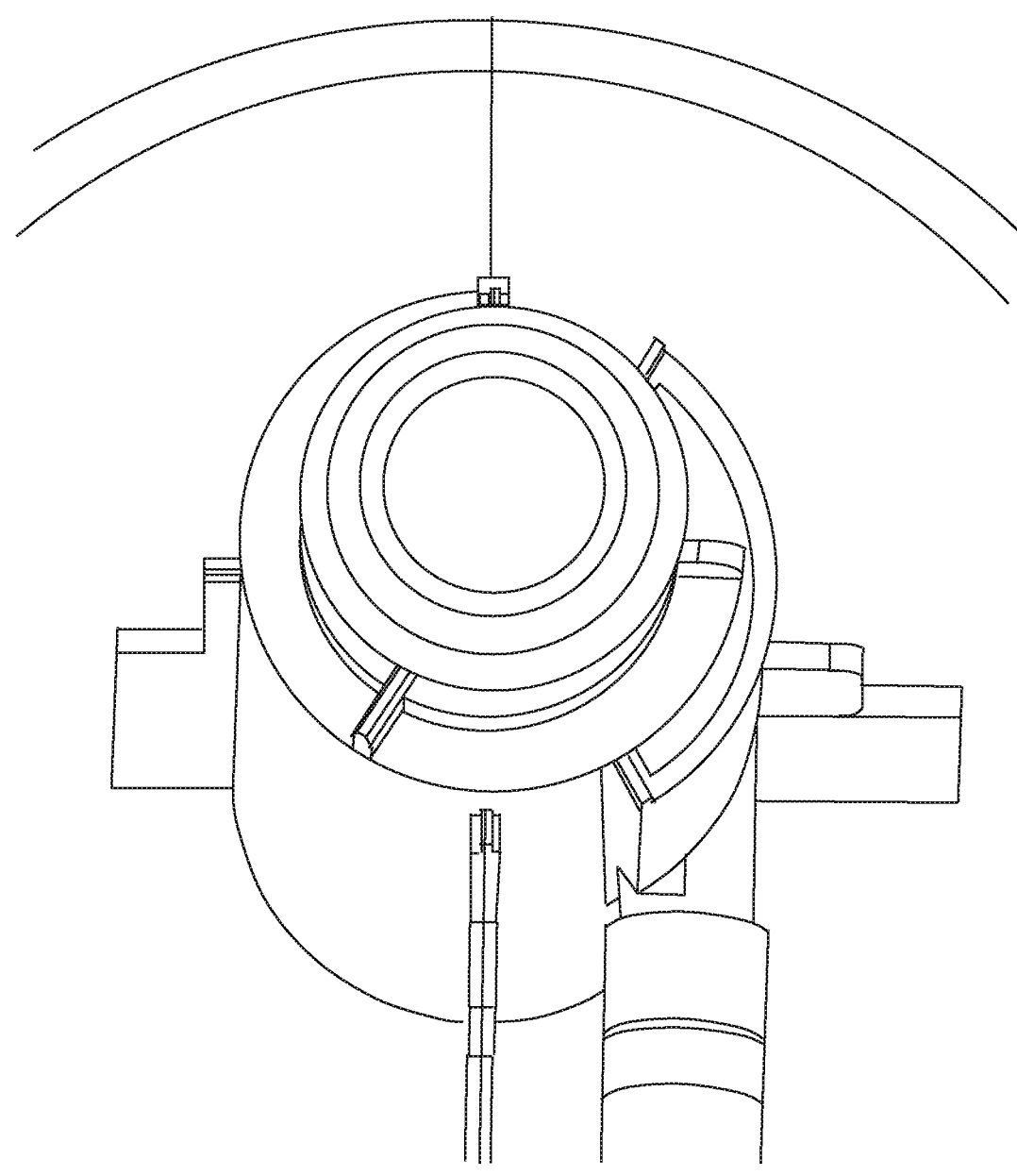
FIG. 4 depicts in a top perspective view the selector in a third position.

The trough 136 and disc 138 are structured and positioned relative to each other such that:
in the first state the solid part 139b completely covers the open top 137;
in the second state the cutout part 139a completely faces the open top 137, and
in the at least one intermediate state the cutout part 139a incompletely faces the open top 137. An intermediate state of "50%" is shown in FIG. 4.

The bypass inlet is in the trough 136.

"Structured" refers in general to both size and shape.

"Solid" refers to keeping a clearshape and being essentially impenetrable to water. In some embodiments the solid part is made of metal. In some embodiments the solid part is made of thermoplastic material/s.

"Essentially" is meant to be at least 95%; for example, "essentially impenetrable" means that less than 5% of the water passes through or around the solid part and not via the cut-out part.

Similarly, "all", "completely" May in some embodiments not be an absolute term, i.e., in some embodiments in the first state not quite all of the water that enters the filter 100 also goes through the first compartment, due to some leaks causing minor amounts of water not to go through the first compartment [for example when the incoming water is at a very high pressure]. In general, very soft water is required for some uses such as for raising some animals e.g., raising discus fish in aquariums, or it is important to have essentially all of the water pass through the first water-treating media, e.g., contaminated or brackish water, however even in such circumstances any leak is expected and designed to have no significant effect on the quality of the water exiting the filter. Of course, it is our aim to design and produce a product that is leak-free and such embodiments are much preferred.

"Cut-out part" relates to a part of the disc via which water can essentially freely pass. The cut-out part in some embodiments comprises a grid, a mesh, a sieve etc. which may help trap particles suspended in the incoming water. In some embodiments the part is simply no material.

In reference to "50%" it should be understood that:

a) The filter is designed, in particular the structure of the trough and the disc/dial and their cooperation [i.e., relative positions, orientations and sizes etc.], so that at the 50% mark the dial encounters some mild resistance such as hitting a small step on the trough or vise versa, i.e., the step is on the rotatable disc, to allow the user to easily set the intermediate state.

b) The division of 50% of the incoming water into the bypass and 50% going to the first compartment is usually not very important, in the sense that a division of 45/55% or even 40/60% is not important to the average user, and thus the 50% is generally approximate.

In some embodiments, parts of the cap are replaceable such that different settings can be added, for example the user may desire a division of 80/20% and a dial can be provided that includes such a setting and the disc and trough may accordingly be replaced with other more suitable ones. In some embodiments the user may select the desired settings at the time of obtaining the filter, e.g., a number of models may be offered to the consumer. Other components such as the types of media may also be selectable. In some embodiments the consumer may be offered to come to a selling point to try different settings before purchase, or a trial filter may be picked up or sent to the consumer's home.

Other arrangements for the inlet and shapes of the selector, including dial, trough, are possible; however, the arcuate shape of the trough 136 well suits a circular dial in respect of compact structure and ease of use. In particular the size and shape of the open top 137 essentially match those of the solid part 139*b,* which means that complete blockage of the bypass is available but also maximum access for incoming water to the first compartment 122 is available. In addition, the indications for the intermediate states of "50%" and "33%", which are the settings most useful for most users, may be placed prominently apart from the "0%" and "100%" settings when the arcuate trough and the circular dial are used, which is useful for ease of setting the filtration. The arrangement was also found to be easier to manufacture than other arrangements that were contemplated during the design of the filter.

Some embodiments further comprise a third compartment 126. The third compartment 126 typically comprises cleaning filter material 152.

In some embodiments the cleaning filter material 152 is ultrafilter material. The filter material 152 serves to remove microorganisms that might be in the water that comes into the filter 100 or in the second water-treating medium [e.g., carbon-based medium].

We now discuss some further useful features of the filter 100.

In some embodiments, as shown in FIG. 1, a filter element 162 is disposed within the second compartment 124 and covers the bypass outlet 144 such as to prevent ingress of the second water-treating medium [e.g., carbon-based medium such as activated carbon] into the bypass 140. Such situation may arise when water supply is suddenly halted, and a sub-pressure build ups in the bypass 140 for example.

In other embodiments other means may be used such as a check valve in the bypass.

The at least one bypasses are preferably internal, meaning that they are wholly contained within the filter, i.e., do not extend out of the first compartment and the second compartment.

In preferred embodiments the cap 114 comprises a space 172 sized to accommodate expansion of the first water-treating medium. Such design allows tightly packing the first compartment 122 with dry material, thus maximizing the treatment, but allows the dry material room to expand when wettened.

In some embodiments the first water-treating medium is a water softening resin, e.g., an ion-exchange medium.

In some embodiments the second water-treating medium is selected from: titania, iron (III) oxides, iron (III) hydroxides, carbon-based media and mixtures thereof. Such media may remove unpleasant odours and flavours from the water such as from chlorine and sulfur-based compounds.

the carbon-based media are, for example, selected from a group consisting of: activated carbon, carbon nanotubes, carbon molecular sieves, charcoal, catalytic carbon and mixtures thereof.

The filter may comprise further compositions capable of treating the water, for example, to reduce traces of radioactive materials in the water. For example, we have discovered that a mixture of basalt, wood chips, cotton wool and activated carbon can significantly reduce the amount of thorium and uranium in water. Such mixture may comprise roughly equal amounts of each w/w. Such treatment mixture may be part of the first water-treatment medium and/or second water-treatment medium and/or in the filter material; in the first compartment and/or in the second compartment and/or the third compartment and/or in one or more bypasses.

Referring again to FIG. 1, water may enter the second compartment and optionally the first compartment and flow down then up via the third compartment 126, through the cleaning filter material 152 and then to a water outlet 212 extending from the cartridge 112, through the disc 138 and out of the cap 114. The water inlet 214 is shown in FIG. 3*c*—it is essentially the selector 130. A flexible pipe may be engaged with the water inlet 124 and then by selection of the dial water is accordingly divided in flow to the first compartment 122 and the second compartment 124. Another flexible pipe [not shown] May be engaged with the water outlet 212. Note that the pipe for the outlet may be placed inside the pipe for the inlet, thus minimizing clutter of the water purification system and maximizing the space 172 inside the cap 114.

The cap 114 may comprise a base 115 with small holes [not shown in the figures] through which water can seep into the first compartment 122. A separating filter element 166 can be placed at the top of the first compartment 122 that separates the first water-treating medium from the base 115, to minimize escape of the first water-treating medium into the cap 114. The separating filter element 166 may be sponge-like and donut-shaped, which in some embodiments is slid onto the third compartment 126. Similarly, a separating filter element 164 may be disposed between the first water-treating medium and the second water-treating medium, thus participating in defining the second compartment 124 and minimizing mixing of the first water-treating medium with the second water-treating medium. The second water-treating medium may fill up part of the third compartment 126, in which case another separating filterelement 168 may be placed between the cleaning filter material 152 and the second water-treating medium.

The third compartment 126 may be inside an open-ended cylinder 118 with another separating filter element 169 to retain the second water-treating medium in the cylinder 118. The cylinder 118 rests on a holed or slitted platform 190 that raises the cylinder 118 and allows water to seep from the second compartment 124 into the cylinder 118.

The cartridge 112 may have a convex bottom to provide structural strength against the water pressure, and a ring around the convex bottom to allow the filter 100 to stand on a surface.

According to another aspect, a water treatment system is provided that comprises any of the filters described above, the system further comprising a filter head reversibly attachable to the filter cap, further comprising a water inlet extending from the filter head to inside the cap, such that water entering the cap for treatment spills onto the disc, and further comprising a water outlet extending from the cartridge, and into the filter head.

The system further may further comprise at least one of the following features:

an observation portal enabling view of water flowing through the water outlet;

a pressure-sensitive button capable of popping when pressure of water flowing out of the filter head is above a predetermined value and sinking when pressure of water flowing through the water outlet is below a predetermined value, and a release portal for release of gases from water in the water outlet.

Such a button may also be advantageously used for systems lacking bypasses.

Note that we have been surprised that the popping button does not require a spring or other resilient means to pop up when the water pressure is adequate and pop down when the pressure decreases.

Figure 5:
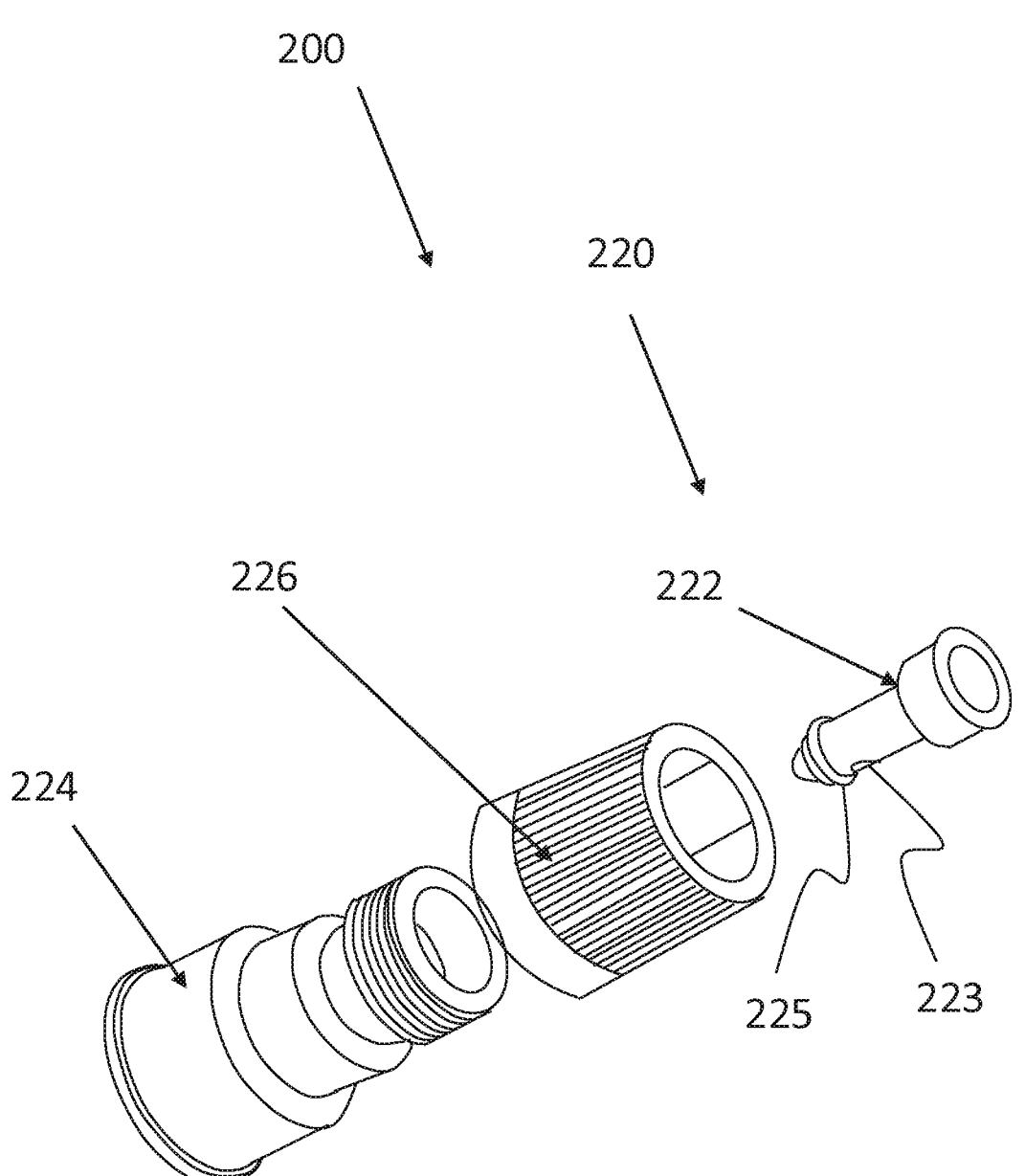
FIG. 5 is an exploded perspective view of a pop-up button for gas release in a filter head that can be engaged with any of the contemplated filters described below.

Reference is now made to an exploded perspective view in FIG. 5 in relation to the gas release button 220. The filter head 200 includes the button 220. The button comprises a piston 222 with gas-release holes 223 and an 0-ring 225. The piston 222 is snugly held inside a threaded housing 224. A threaded button cap 226 holds the piston 222 inside the housing 224.

Such a system allows to monitor the water purification in several ways.

The filter head could replace the filter heads in household systems that have already been installed. However, the proposed filters may also be retrofitted to filter heads that are already installed in households, thus upgrading their capabilities and versatility and customization at no extra cost to the consumer.

Since the filter heads are often placed in places that are hard to access for manipulation, such as under a sink, setting the water treatment with a dial on the filter itself is a great advantage. The user, upon receiving a new filter, can easily set the treatment by placing the filter on a surface such as a tabletop or countertop, and turning the dial. Alternatively, a filter can easily be set at the vendor according to the user's request.

In some embodiments the observation portal, pressure sensitive button and release portal are disposed in the filter head.

A number of embodiments of the disclosure have been described. Nevertheless, it will be understood that various modifications may be made without departing from the spirit and scope of the disclosure. Accordingly, other embodiments are within the scope of the following claims.

The aspects and examples set forth herein and recited in the claims can be understood in view of the above definitions.

Additional Notes

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

Throughout the specification "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range, as if such value or sub-range were explicitly recited. For example, a range from about 2 nm to about 20 nm should be interpreted to include not only the explicitly recited limits of from about 2 nm to about 20 nm, but also to include individual values, such as about 3.5 nm, about 8 nm, about 18.2 nm, etc., and sub-ranges, such as from about 5 nm to about 10 nm, etc. Furthermore, when "about" and/or "substantially" are/is utilized to describe a value, this is meant to encompass minor variations (up to +/−10%) from the stated value.

While several examples have been described in detail, it is to be understood that the disclosed examples may be modified. Therefore, the foregoing description is to be considered non-limiting.

While certain examples have been described, these examples have been presented by way of example only and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure.

Features, materials, characteristics, or groups described in conjunction with a particular aspect, or example are to be understood to be applicable to any other aspect or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing examples. The protection extends to any novel one, or any novel combination, of the features disclosed in this specification (including any accompanying claims and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable sub combination. Moreover, although features may be described above as acting in certain combinations, one or more features from a claimed combination can, in some cases, be excised from the combination, and the combination may be claimed as a sub combination or variation of a sub combination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some examples, the actual steps taken in the processes illustrated and/or disclosed may differ from those shown in the figures. Depending on the example, certain of the steps described above may be removed or others may be added. Furthermore, the features and attributes of the specific examples disclosed above may be combined in different ways to form additional examples, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular example. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "May," unless specifically stated otherwise, or otherwise understood within the context as used, is generally intended to convey that certain examples include, while other examples do not include, certain features, elements, and/or steps. Thus, such conditional language is not generally intended to imply that features, elements, and/or steps are in any way required for one or more examples or that one or more examples necessarily include logic for deciding, with or without user input or prompting, whether these features, elements, and/or steps are included or are to be performed in any particular example.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain examples require the presence of at least one of X, at least one of Y, and at least one of Z.

Language of degree used herein, such as the terms "approximately," "about," "generally," and "substantially" represent a value, amount, or characteristic close to the stated value, amount, or characteristic that still performs a desired function or achieves a desired result.

The scope of the present disclosure is not intended to be limited by the specific disclosures of preferred examples in this section or elsewhere in this specification and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

The invention claimed is:

1. A water treatment system comprising a filter and a filter head;
   the filter comprising:
   a cartridge;
   a cap attached to the cartridge;
   the cartridge comprising:
      a first compartment comprising at least one first water-treating medium;
      a second compartment comprising at least one second water-treating medium;
   the cap comprising a selector;
   the filter further comprising at least one bypass extending from the selector and throughout the first compartment and into the second compartment, each of the at least one bypass having an inlet and an outlet;
   wherein the selector is operable to allow selecting:
   in a first state all water entering the filter passing through the first compartment;
   in a second state all water entering the filter bypassing the first compartment and passing through the second compartment;
   in at least one intermediate state a first part of water entering the filter passing through the first compartment and a second part of water entering the filter bypassing the first compartment and passing through the second compartment, and
   the filter head reversibly attachable to the cap.

2. The system of claim 1, further comprising a water inlet extending from the filter head to inside the cap, such that water entering the cap for treatment spills onto the disc.

3. The system of claim 1, further comprising a water outlet extending from the cartridge, and into the filter head.

4. The system of claim 1, wherein the cap comprises a reference marking, and wherein the selector comprises:
   a dial marked thereon with indications, the indications representing:
   the first state, the second state, and at least one intermediate state,
   wherein each state is embossed at a different location on the dial;
   and wherein each state occurs when the indication representing the state is aligned with the reference marking.

5. The system of claim 1, the selector further comprising an arcuate trough with an open top;
   the dial comprising a rotatable disc having a cut-out part and a solid part,
   the trough and disc structured and positioned relative to each other such that:
   in the first state the solid part completely covers the open top;
   in the second state the cut-out part completely faces the open top, and
   in the at least one intermediate state the cut-out part incompletely faces the open top.

6. The system of claim 5, wherein at least one bypass inlet is in the trough.

7. The system of claim 5, further comprising a water outlet extending from the cartridge, through the disc and out of the cap.

8. The system of claim 1, further comprising a third compartment; the third compartment comprising filter material.

9. The system of claim 7, wherein the filter material is ultrafiltration material.

10. The system claim 1, further comprising a filter element within the second compartment and covering each bypass outlet of the at least one bypass, thereby preventing ingress of the second water-treating medium into the at least one bypass.

11. The system of claim 1, wherein the cap comprises a space sized to accommodate expansion of the first water-treating medium.

12. The system of claim 1, wherein the first water-treating medium is a water softening resin.

13. The system of claim 12, wherein one or more of the at least one bypass comprises magnesium and essentially does not comprise calcium.

14. The system of claim 1, wherein second water-treating medium is selected from: titania, iron (III) oxides, iron (III) hydroxides, carbon-based media and mixtures thereof.

15. The system of claim 14, wherein the carbon-based media are selected from a group consisting of:

activated carbon, carbon nanotubes, carbon molecular sieves, charcoal, catalytic carbon and mixtures thereof.

16. The system of claim 1, wherein the at least one bypasses are internal to the cartridge.

17. The system of claim 1, wherein during the first state all water passing through the first compartment subsequently passes through the second compartment.

18. The system of claim 1, wherein one or more of the at least one bypass comprises magnesium and essentially does not comprise calcium.

19. The system of claim 18, wherein none of the at least one bypass essentially comprise calcium.

20. A water treatment system comprising a filter and a filter head;

the system further comprising a pressure-sensitive button capable of popping when pressure of water flowing out of the filter head is above a predetermined value and sinking when pressure of water flowing out of the filter head is below a predetermined value, the system optionally further comprising: an observation portal enabling view of water flowing out of the filter head;

a release portal for release of gases from water flowing out of the filter head;

wherein the observation portal, pressure sensitive button and/or release portal are disposed in the filter head;

the filter comprising:
      a cartridge;
      a cap attached to the cartridge;
      the cartridge comprising:
         a first compartment comprising at least one first water-treating medium;
         a second compartment comprising at least one second water-treating medium;
      the cap comprising a selector;
      the filter further comprising at least one bypass extending from the selector and throughout the first compartment and into the second compartment, each of the at least one bypass having an inlet and an outlet;
      wherein the selector is operable to allow selecting:
   in a first state all water entering the filter passing through the first compartment;
   in a second state all water entering the filter bypassing the first compartment and passing through the second compartment;
   in at least one intermediate state a first part of water entering the filter passing through the first compartment and a second part of water entering the filter bypassing the first compartment and passing through the second compartment, and the filter head reversibly attachable to the cap.

\* \* \* \* \*